United States Patent [19]
Kneezel

[11] Patent Number: 5,598,191
[45] Date of Patent: Jan. 28, 1997

[54] ARCHITECTURE FOR AN INK JET PRINTER WITH OFFSET ARRAYS OF EJECTORS

[75] Inventor: Gary A. Kneezel, Webster, N.Y.

[73] Assignee: Xerox Corporation, Stamford, Conn.

[21] Appl. No.: 457,725

[22] Filed: Jun. 1, 1995

[51] Int. Cl.⁶ .................. B41J 2/145; B41J 2/15; B41J 2/21
[52] U.S. Cl. .................. 347/40; 347/43
[58] Field of Search .................. 347/40, 41, 43

[56] References Cited

U.S. PATENT DOCUMENTS

| | | |
|---|---|---|
| 4,431,319 | 2/1984 | Karaki et al. . |
| 4,750,009 | 6/1988 | Yoshimura . |
| 4,751,659 | 6/1988 | Hecht . |
| 4,812,859 | 3/1989 | Chan et al. . |
| 4,922,271 | 5/1990 | Nilsson et al. . |
| 4,967,203 | 10/1990 | Doan et al. . |
| 5,030,971 | 7/1991 | Drake et al. . |
| 5,057,852 | 10/1991 | Formica et al. . |

*Primary Examiner*—Benjamin R. Fuller
*Assistant Examiner*—Thinh Nguyen
*Attorney, Agent, or Firm*—R. Hutter

[57] ABSTRACT

An ink-jet printer includes a printhead disposed on a reciprocating carriage. The printhead includes two sets of ejectors spaced by a predetermined pitch, in collinear linear arrays. The two sets of ejectors are offset by a partial pitch to enable interleaving of print swaths by the two sets of ejectors, in order to print at a higher resolution than the predetermined pitch would allow.

19 Claims, 5 Drawing Sheets

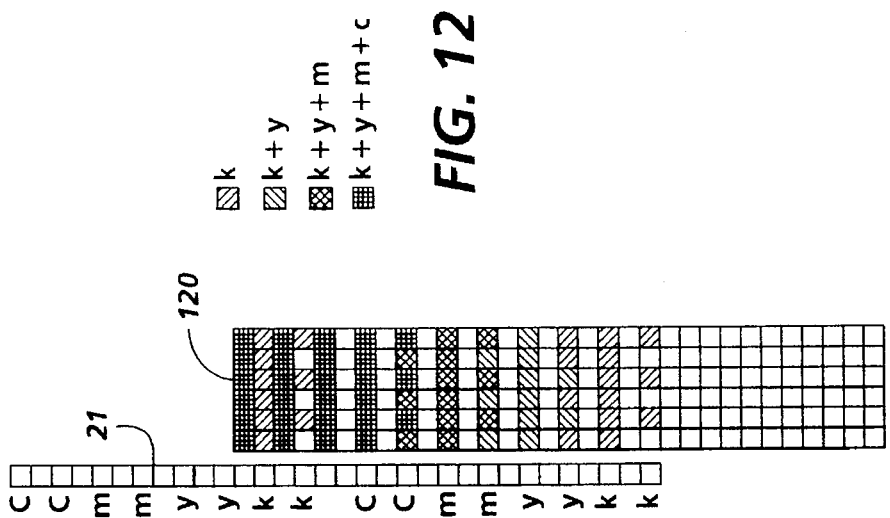
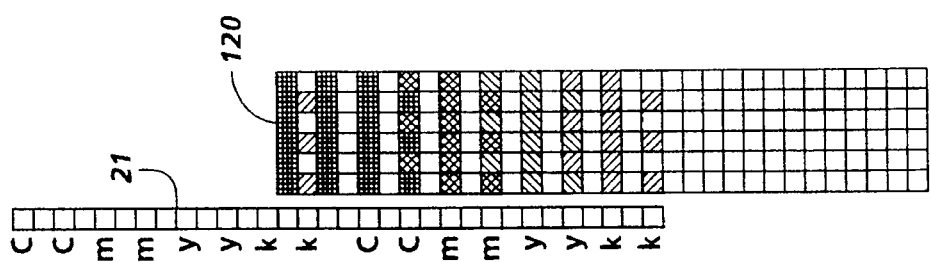
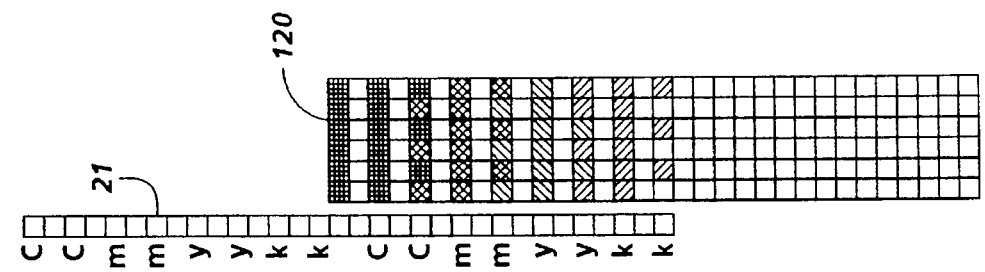
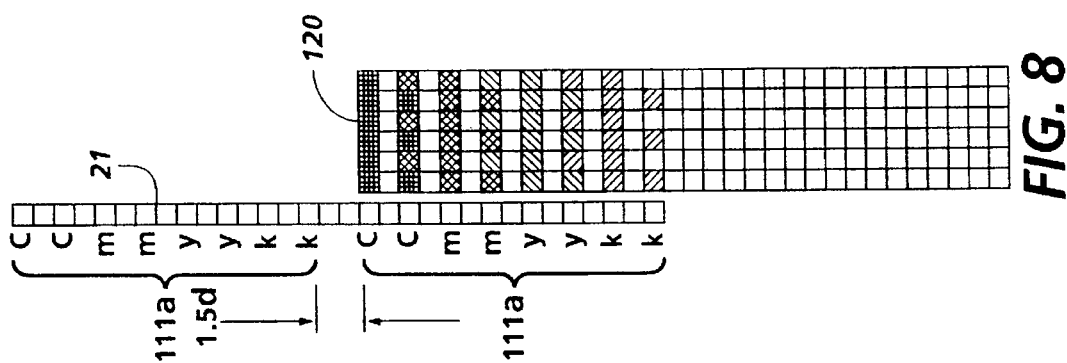

ARCHITECTURE FOR AN INK JET PRINTER WITH OFFSET ARRAYS OF EJECTORS

The present invention relates to ink-jet printing, and is more particularly concerned with using sets of arrays of ink ejectors which have a pitch that is nominally constant within each set, but which have a partial pitch offset between sets in order to facilitate higher resolution printing.

In existing apparatus for thermal ink jet printing, such as disclosed in U.S. Pat. No. 4,463,359, the printhead typically comprises one or more ink ejectors, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. The acceleration of the ink out of the nozzle while the bubble is growing provides the momentum and velocity of the droplet in a substantially straight line direction towards a print sheet, such as a piece of paper. Because the droplet of ink is emitted only when the resistor is actuated, this type of thermal ink-jet printing is known as "drop-on-demand" printing. Other types of ink-jet printing, such as continuous-stream or acoustic, are also known.

In a single-color ink jet printing apparatus, the printhead typically comprises a linear array of ejectors, and the printhead is moved relative to the surface of the print sheet, either by moving the print sheet relative to a stationary printhead, or vice-versa, or both. In a carriage-type apparatus, a relatively small printhead reciprocates across a print sheet numerous times in swaths, much like a typewriter. When the printhead and the print sheet are moved relative to each other, imagewise digital data is used to selectively activate the thermal energy generators in the printhead over time so that the desired image will be created on the print sheet.

In the current market for desktop printing apparatus, a desirable resolution is 600 spots per inch (spi). With an ink-jet printer, the resolution of which the printer is capable is typically fixed by the size and configuration of the ejectors which, in response to digital-wise data, emit droplets of ink onto the paper or other substrate. Most common printhead designs include at least one silicon chip onto which either electronic heating elements or ink channels are etched onto a silicon chip; in some common designs, one silicon chip is used for the creation of heating elements therein, and another chip is used for defining ink channels, and the two silicon chips are bonded face to face to create a set of complete ejectors. The higher the resolution of the printing apparatus, the physically smaller the individual ejectors must be, and the closer such ejectors must be spaced on a printhead chip. An inevitable consequence of providing a printhead with a higher resolution (e.g. 600 spi or higher) is that the risk of failure of an individual ejector in the printhead, which may be fatal to image quality, increases with the small size and crowding of ejectors on a single chip. It is therefore desirable that a printhead architecture be provided which can create images of a desired high resolution, while minimizing the downside effects caused by making smaller ejectors and crowding more of them onto a chip.

U.S. Pat. No. 4,812,859 discloses an ink-jet recording head wherein a plurality of nozzle groups are in communication with individual chambers, each chamber adapted to convey ink of one color. The head is retrofitable in a single-color printer to provide multicolor printing capability. The nozzle groups each duplicate a different longitudinal segment of the single color nozzle column pattern.

U.S. Pat. No. 4,431,319 discloses a dot-matrix printer which prints alphanumeric characters and symbols twice, with a vertical distance between the first and second printing corresponding to half of the vertical pitch distance of the dots in the first printing.

U.S. Pat. No. 4,750,009 discloses an ink-jet printer in which a plurality of ejectors are provided in the main scanning direction correspond to various color inks. The orifices of the ejectors in each group are spaced by a specified distance away from one another in the sub-scanning direction.

U.S. Pat. No. 4,751,659 discloses an "image bar," such as a LED bar, for discharging a photoreceptor. The image bar redundantly addresses all pixel positions within an address space, so that the "footprint" of the pixel generators of the image bar is shifted back and forth across an intregal number of pixel positions along the width of the image bar. Various partial images, created by different footprints of the pixel generators, are recorded on a suitable recording medium, so that certain print defects caused by defects in the image bar are effectively smoothed over.

U.S. Pat. No. 4,855,752 discloses a method of creating an area of a preselected hue comprising a plurality of printed primary colors, in which the various swaths of primary colors are each offset by a predetermined amount, in order to minimize the visual "banding" effect when the boundaries between the swaths of different colors are coincident.

U.S. Pat. No. 4,922,271 discloses a dot-matrix printer having a plurality of write heads. In order to enhance the resolution beyond the basic resolution of each write head, a plurality of rows of write heads are provided, arranged phase-shifted relative to one another.

U.S. Pat. No. 4,967,203 discloses a method of producing a color image in an ink-jet printer wherein successive applications of ink dots are staggered relative to pixel locations such that overlapping ink dots are printed on successive passes of a printhead. Pixels are grouped into superpixels and various combinations of colored ink dots are applied to each pixel within each superpixel in a staggered sequence.

U.S. Pat. No. 5,030,971 discloses a "roofshooter" ink-jet printhead having a common heater substrate having at least two arrays of heating elements and a corresponding number of feed slots. Each nozzle array is isolated from an adjacent nozzle array and each nozzle is lined above a respective heating element of a corresponding heater array. With this construction, multi-color printheads are efficiently arranged on a single wafer.

U.S. Pat. No. 5,057,852 discloses an apparatus and method of producing enhanced four-color images with an ink-jet printer. True black ink is aligned for printing between cyan, magenta and yellow color spots in a full-color image. When a black edge is desired, process black (derived from a combination of primary colors) and the true black ink are both used to produce the pixels along the edge. The patent shows a printhead having nozzles for colored inks positioned in line with each other in the direction of travel of the printhead, with the black ink nozzle being disposed in separate lines.

According to one aspect of the present invention, there is provided a printhead for ejecting ink imagewise onto a substrate. A first plurality of ejectors is arranged in a linear array, with the ejectors thereof being spaced by a predetermined pitch. A second plurality of ejectors is arranged in a linear array collinear with the first plurality of ejectors, the ejectors thereof being spaced by the predetermined pitch. The first plurality of ejectors and the second plurality of ejectors are spaced from each other by an integral number of pitches plus a partial pitch.

According to another aspect of the present invention, there is provided an ink-jet printer for ejecting ink imagewise onto a substrate. A printhead includes a first plurality of ejectors arranged in a linear array, with the ejectors thereof being spaced by a predetermined pitch. A second plurality of ejectors is arranged in a linear array collinear with the first plurality of ejectors, the ejectors thereof being spaced by the predetermined pitch. The first plurality of ejectors and the second plurality of ejectors are spaced from each other by an integral number of pitches plus a partial pitch. Means are provided for moving the printhead relative to the substrate along a path in a fast scan direction perpendicular to the linear arrays.

According to another aspect of the present invention, there is provided an ink-jet printer for ejecting ink imagewise onto a substrate. A printhead includes a first plurality of ejectors arranged in a linear array, with the ejectors thereof being spaced by a predetermined pitch. A second plurality of ejectors is arranged in a linear array collinear with the first plurality of ejectors, the ejectors thereof being spaced by the predetermined pitch. The first plurality of ejectors and the second plurality of ejectors are spaced from each other by 1.5 pitches. Means are provided for moving the printhead relative to the substrate along a path in a fast scan direction perpendicular to the linear arrays, and for indexing the substrate relative to the printhead by an index length along a path perpendicular to the fast scan direction. The index length is equal to 0.5, times the number of ejectors in each plurality of ejectors, times the predetermined pitch.

IN THE DRAWINGS

FIG. 8–11 show a comparable sequence of print events with successive passes of a printhead in a full-color embodiment of a printhead according to the present invention;

FIG. 12 is a "key" showing the potential placement of ink droplets in the pixie areas of FIGS. 8–11;

Figure 1:
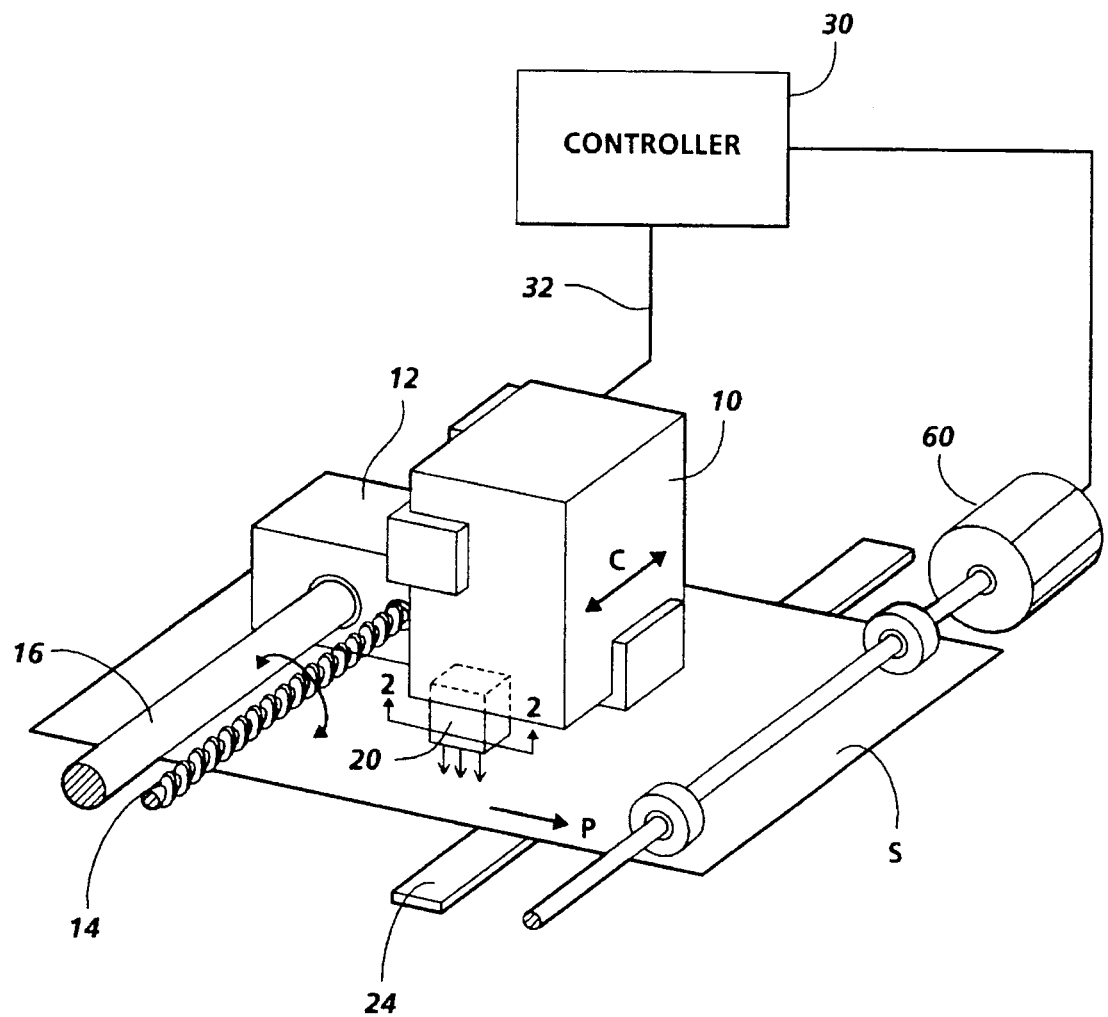
FIG. 1 is a perspective view showing the basic elements of a reciprocating-carriage-type thermal ink-jet printer, according to the present invention.

FIG. 1 shows the rudiments of a reciprocating-carriage-type thermal ink-jet printer for creating color or monochrome images on a sheet S. An ink cartridge 10, having a plurality of ink supplies therein, is preferably removably mounted on a carriage 12. This carriage 12 is adapted to move in a back-and-forth manner in direction C across sheet S, which is moving in paper advance direction P. The sheet S is caused to move in direction P by means of a stepper motor or other indexing motor 60, which is preferably adapted to cause the motion of sheet S in direction P in a stepwise fashion, holding the sheet S in a stationary position while the cartridge 10 moves across the sheet in direction C, and then indexing the sheet S in paper advance direction P between swaths of printing caused by the action of cartridge 10 on carriage 12.

Carriage 12 is provided with one of various possible means for moving the cartridge 10 back and forth across sheet S. As shown in FIG. 1, there is provided, for example, a rotatable lead screw 14 having threads thereon which interact with a structure on the carriage 12 so that, when lead screw 14 is caused to rotate by a motor (not shown), the interaction of the lead screw threads with the structure on carriage 12 will cause the carriage 12 and the cartridge 10 mounted thereon to move bidirectionally in direction C across the sheet S. Further mechanical stability is provided for the motion of carriage 12 by, for example, a stabilizing rod 16 which passes through an opening in the carriage 12.

At the bottom of cartridge 10, as shown in FIG. 1, is a printhead 20, which is shown directed downward toward the sheet S. Printhead 20 comprises one or more linear arrays of thermal ink-jet ejectors, each ejector being operatively connected to a particular ink supply, in a manner which will be described in detail below, depending on the specific embodiment of the present invention. Generally, the linear array of ejectors in printhead 20 extends in a direction parallel to paper advance direction P, so that, when the cartridge 10 is caused to move in carriage direction C, the linear array will "sweep" across the sheet S for an appreciable length, thus creating a print swath. While the carriage is moving across the sheet S, the various ejectors in the linear array are operated to emit controlled quantities of ink of preselected colors in an imagewise fashion, thus creating the desired image on the sheet.

Also optionally provided "downstream" of the printhead 20 along paper advance direction P is drying means which are generally shown in FIG. 1 as a heating plate 24. The purpose of the drying means is to provide energy to ink which has just been placed on the sheet S, so that the ink will dry more quickly. Although a heating plate 24 is shown in FIG. 1, the drying means may include any number of devices for conveying heat or other energy to the ink placed on the sheet S. One particular drying means, for example, is a device for conveying microwave energy to the ink on the sheet, thereby alehydrating the sheet while limiting the extent of heat spread throughout the system, which may have an adverse effect on the operation of the printer as a whole. Other techniques for drying the ink in an efficient manner may also be contemplated such as providing a light flash, radiant or convective heat, or creating induction heat within a conductive member adjacent the sheet.

Operatively associated with the printhead 20 is a data input device, or controller, which is generally shown by a schematic box 30 connected by a bus 32 to the printhead 20. The purpose of the controller 30 is to coordinate the "firing" of the various ejectors in the printhead 20 with the motion of cartridge 10 in carriage direction C, and with the paper advance direction P of sheet S, so that a desired image in accordance with the digital data is rendered in ink on the sheet S. Image data in digital form is entered into controller 30, and controller 30 coordinates the position of the printhead 20 relative to a sheet S, to activate the various ejectors as needed, in a manner generally familiar to one skilled in the art of ink-jet printing. Controller 30 will also be operatively associated with the various motors such as 60, controlling the position of sheet S through paper advance direction P, and also the motion of the carriage 12, through means not shown.

Figure 2:
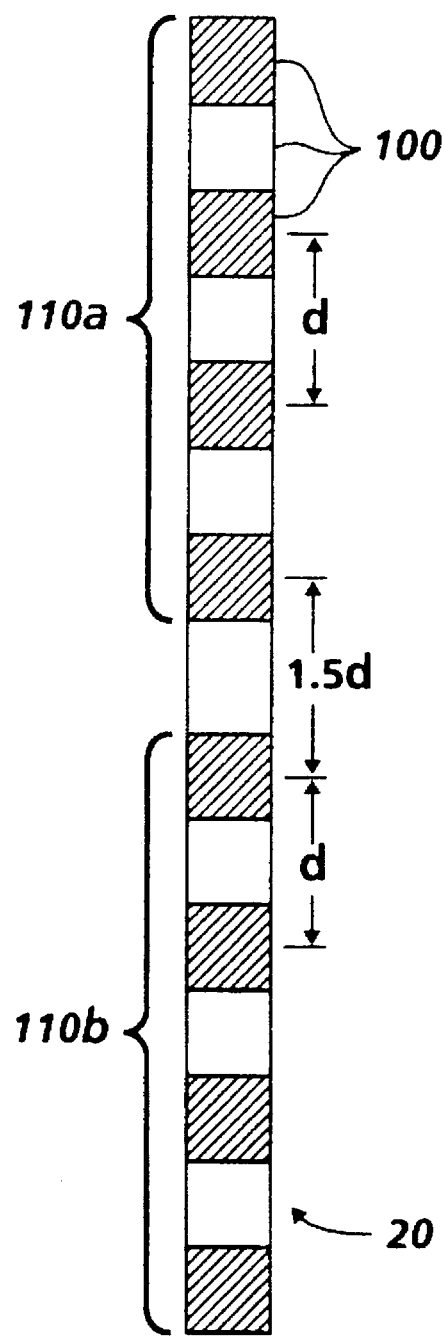
FIG. 2 is a simplified plan view showing the configuration of ejectors in a printhead according to one embodiment of the present invention.
Figure 7:
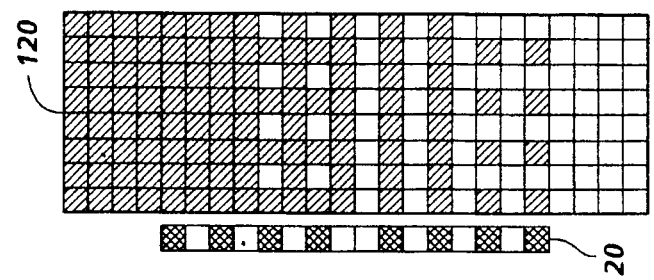
FIGS. 3–7 show a sequence of printing events caused in successive passes of a printhead according to the present invention relative to a grid showing the position of particular pixel areas.

FIG. 2 is simplified plan view showing the configuration of ejectors in an ink-jet printhead 20. As shown in FIG. 2, all that is represented is the positions of the various ejectors relative to each other; for purposes of the present invention, the specific structure of each ejector, such as whether it is a thermal-ink jet ejector of one or another type, is largely irrelevant. As shown in FIG. 2, the printhead 20 (essentially shown from the point of view of the substrate) includes a number of ejectors 100, here shown as shaded areas indicating the orifices of each ejector through which a droplet of ink is ejected onto a substrate. The ejectors are organized into two distinct sets or pluralities, here shown as 110a and 110b. As shown in FIG. 20, there are only four ejectors 100 per set, 110a or 110b; this is shown for purposes of clarity only, and more typically a practical embodiment of a printhead 20 may include as many as 128 ejectors 100, with 64 ejectors in each set 110a or 110b, or even several hundred ejectors.

Within each set 110a or 110b, the ejectors 100 are spaced with a regular "pitch," or spacing, between neighboring ejectors 100 in a linear array. This consistent pitch is shown as distance d in FIG. 2 and is intended to be consistent for every pair of neighboring ejectors 100 in each set 110a or 110b. However, significantly, at the junction in the middle of printhead 20 between set 110a and set 110b, the neighboring end ejectors 100 of each set are spaced with a spacing of 1.5 d. More generally, according to the present invention, the first set of ejectors and the second set of ejectors are spaced from each other by an integral number of pitches plus a partial pitch: the integral number could be zero, and the size of the partial pitch is generally dependent on how many sets of ejectors are provided in the printhead. For a printhead having two sets of ejectors, the nominal partial pitch would preferably be one-half pitch, and for a printhead with three offset sets of ejectors, the nominal offset between sets would be either one-third or two-thirds of a pitch. This relative offset of sets of ejectors enables the interleaving of print swaths with successive passes of the printhead, as will be described in detail below.

FIGS. 3–7 show a sequence of printing operations performed by a single printhead 20 relative to a grid 120 which is intended to be representative of a particular preselected area on a sheet S as shown, for example, in FIG. 1. Of course, the grid 120 itself is not intended to be printed or marked on the sheet but is rather illustrated for a clearer understanding of the relative position of spot placement by various ejectors such as 100 shown in FIG. 2, which are indicated in FIGS. 3–7 by black squares within printhead 20. As viewed in FIGS. 3–7, the printhead 20 is intended to pass relative to the sheet in a fast scan direction (carriage direction C in FIG. 1) which is perpendicular to the orientation of the linear arrays of ejectors in printhead 20. Further, as is known in the art of ink-jet printing, following every pass of the printhead in the fast-scan direction across the sheet, the sheet is indexed through a paper advance direction (direction P in FIG. 1) by a predetermined "index length" so that other portions of the sheet can be printed upon by the printhead 20 in a subsequent pass. A significant advantage of the present invention is that all potential pixel locations at the higher resolution are accessible using a single index length in direction P. To accomplish this with a single linear array of ejectors all at one pitch, at least two different index lengths would need to be provided by the printer mechanism. As illustrated in FIGS. 3–7, the particular spots created by particular ejectors in various passes of printhead 20 can be made while the printhead 20 is moving in a forward or backward direction (that is, either to the left or right as viewed in the Figures).

Each ejector within the example printhead 20 is capable of ejecting a droplet of ink onto the sheet. The droplets are of such a size as to each create spot of ink of a predictable size on the paper. According to a preferred embodiment of the present invention, the size of such a spot should be approximately equal to half the distance d between adjacent ejectors in the printhead itself. (Square spots are shown in the figures for simplicity. For the more realistic case of substantially round spots, the diameter of the smaller spots should be at least half the square root of 2 times d, so that diagonally adjacent round spots will overlap at their intersection.) In other words, when two neighboring ejectors in one set on printhead 20 both eject droplets onto the sheet, the resulting spots should be of such a size that the blank space between the resulting spots could receive another spot of comparable size. This condition is evident by the placement of spots which are shown as darkened areas within the grid 120.

In addition to creating spots of such a diameter and with such spacing that other spots of similar dimension and spacing can be placed between spots in a subsequent pass, a preferred embodiment of the present invention provides that the control means which cause the various ejectors to operate in response to imagewise data cause each ejector in the printhead to skip a periodic proportion of pixel areas represented by the squares in the grid 120 when moving relative to the sheet in the fast-scan direction. In the illustrated embodiment, this periodic proportion of skipped pixel areas is embodied as controlling the ejectors so that every other pixel area in grid 120 receives a spot of ink, depending further of course on whether the image data demands that a spot of ink be placed in that particular pixel area. This principle can be seen, for example, in the darkened pixel areas shown in grid 120 in FIG. 3, where every other pixel area in the two printed horizontal lines is skipped by the action of the ejectors. The fast-scan dimension of spots (shown as horizontal rows of pixel areas in the grid of 120) is thus made consistent with the skipping of pixel areas in the index direction (shown as vertical columns in grid 120).

With the above-described principles of the operation of the printhead 20, the sequence of spot placements in the pixel areas defined by grid 120 with successive passes of the printhead is apparent in the Figures. First, as shown in FIG. 3, two rows of pixel areas receive ink spots from the available ejectors in every other pixel area thereof; the two horizontal rows of pixel areas are separated by a horizontal row of pixel areas which corresponds to the spacing between the two firing rows of ejectors.

Figure 4:
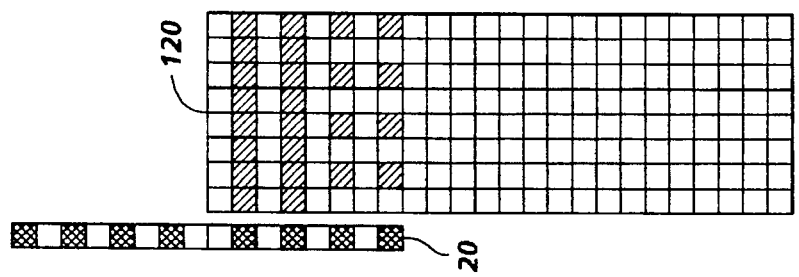
Figure 3:
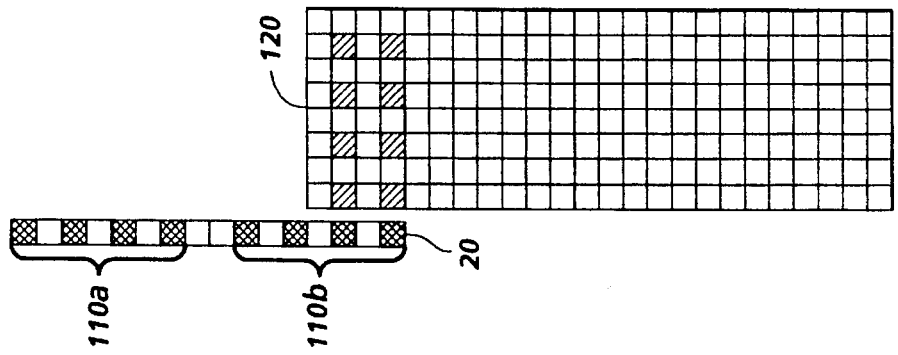

In a second sweep, shown in FIG. 4, the printhead 20 has been indexed by a certain index length relative to grid 120 so that the rows of pixel areas which had received ink spots in the first pass are now available to a second set of ejectors, which place spots of ink in the skipped pixel areas from the first pass shown in FIG. 3. However, it will be noted in FIG. 4 that the rows of pixel areas which remain in the areas between ejectors in the available portion of printhead have yet to receive any ink therein.

Figure 5:
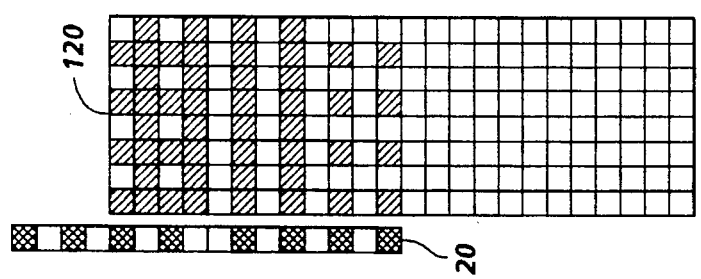

FIG. 5 shows a subsequent pass of printhead 20 on the grid 120, now illustrating the effects of the 1.5 pitch offset between ejector sets 110a, 110b within printhead 20. The partial-pitch offset of 1.5 d between the sets of ejectors 110a and 110b enable the ejectors of one set to access areas of the grid 120 which, because of the alignment of ejectors in the fast-scan direction, were not accessible to the ejectors in the first set. Thus, as shown in FIG. 5, the topmost row of pixel areas as shown in grid 120, which had been skipped by the ejectors in set 110b, can now receive ink from some ejectors in set 110a. As described in the claims herein, this interleaving of rows of pixel areas in successive passes of the printhead is referred to as an interleaving of print swaths. Once again, with the first pass through a particular horizontal row of pixel areas, only every other pixel area in the horizontal row is eligible to receive a drop of ink, as can be seen in the first and third rows from the top of grid 120 in FIG. 5.

Figure 6:
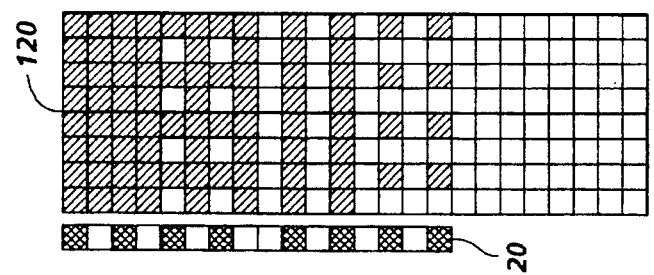

As shown in FIG. 6, the printhead 20 has been indexed by another index length relative to grid 120 so that the further progress of filling in alternating pixel areas in both the fast-scan and indexing dimensions on grid 20 can be continued. This process is shown with another iteration in FIG. 7.

One practical advantage of the above-described system for placing spots of ink in alternating rows and columns, to be filled in with subsequent passes, is that once a drop of ink is placed on the sheet to form a spot, the particular droplet of ink is given a relatively long amount of time to dry or soak into the paper before spots are placed in adjacent pixel areas. The advantage of this feature is that too-close placement of adjacent ink droplets before one ink droplet has fully dried or been soaked into paper may cause print-quality problems such as ink blooming or smearing. With the system of the present invention, each droplet of ink placed on the sheet is either placed next to areas where no ink has been placed previously, or else has been placed next to an adjacent ink spot which has had time to dry or soak into the paper beforehand, so that the ink from a given droplet will tend to blend less into liquid ink which has been previously placed on the sheet.

The particular illustrated embodiment in FIGS. 2–7 above show an example eight-ejector printhead, although it is more likely that, in a practical embodiment of such a system, many more ejectors would be desirable in the printhead. One typical design of a printhead includes 128 ejectors. In general, for a given number N of ejectors within each set such as 110a or 110b, in a printhead composed of two sets, each set having N ejectors spaced pitch d, the index length by which the sheet is advanced with every indexing thereof should be 0.5×N×d in order to access all pixel areas on the sheet. In the fast-scan direction, it will be necessary to fire the ejectors at a frequency to give pixel spacing of 0.5 d in the fast-scan direction.

FIGS. 8–11 show another sequence of printhead operations on a grid 120 with a color variant of the printhead of the present invention, here indicated as 21. The printhead 21 is largely identical to the printhead 20 described in the previous embodiment, but printhead 21 has been adapted for full-color operation. As can be shown in each Figure, the printhead 21 is divided into sets 111a and 111b of ejectors, which are spaced from each other by the pitch 1.5 d at the junction thereof. Each set, however, is further subdivided into primary-color sets of ejectors, which are arranged in contiguous subsets along the linear array of each set. As shown in FIGS. 8–11, each particular ejector shown in printhead 21 is identified by a small primary color letter (cyan, magenta, yellow, and black (k)) in the particular location within the printhead 21. In the illustrated embodiment only two of each primary color ejector is shown within printhead 21, although in a more practical version there may be approximately 24 to 32 or more ejectors of each primary color in each set in the printhead 21.

FIG. 12 is a "key" illustrating the placement of colors in various locations within grid 120 with successive passes of printhead 21. Comparing FIG. 12 to the successive overlays of colors in FIGS. 8–11, it can be seen that the operation of set 111b is to successively overlay primary colors in alternating pixel locations within each available horizontal row within grid 120. Comparing, for example, the operation of the pass in FIG. 8 with the pass in FIG. 9, it can be seen that the first k ejector in the printhead first places alternating spots of black ink in a particular horizontal row in the grid, while the next ejector k (second from the bottom) fills in the alternating spaces which were left by the first ejector k. Similarly, with the y, m and c ejectors, the first of each pair lays down alternating spots and the second of each pair fills in the spaces which had been left by the previous pass of the preceding ejector in the preceding pass.

When the second set of ejectors, hereshown as 111a, comes into range of a particular area of a sheet as shown by grid 120, the general process of overlaying different-colored inks is repeated on the horizontal rows which have been left blank by the operation of the previous set 111b of ejectors, as can be seen in FIG. 11. Once again, this process of first performing the printing operation on spaced rows of pixel areas and then filling in the blank spaces between the original spaced rows is made possible by the arrangement of the two sets of ejectors being spaced by an intregal number of pitches plus a partial pitch. Further, as in the previous embodiment, the fact that droplets are placed on particular pixel areas, and then an appreciable amount of time between printhead passes is allotted before further droplets of ink are placed on or adjacent to the pixel area, prevents the undesirable smearing of liquid ink either within a single pixel area or among adjacent pixel areas on the surface of the sheet. In this way, a high level of print quality is possible, even in a full-color context.

The illustrated example of FIGS. 8–11 assume that every pixel area in a grid 120 will receive ink of every color. Of course, in a real-world application, only a portion of the pixel areas in grid 120 will receive ink of any particular color, in accordance with the image data relating to the desired full-color image. What is shown in FIGS. 8–11 (as well as FIG. 3–7) is the locations upon which ink from particular ejectors is capable of being placed. The basic technique shown in FIGS. 8–11 will of course be combined with other image-processing techniques in order to yield a desired full-color image with, for example, realistic color halftones. Indeed, the particular arrangement of sets of ejectors may enable new image-processing options for obtaining a large halftone range and resolution with a given printer architecture.

Figure 13:
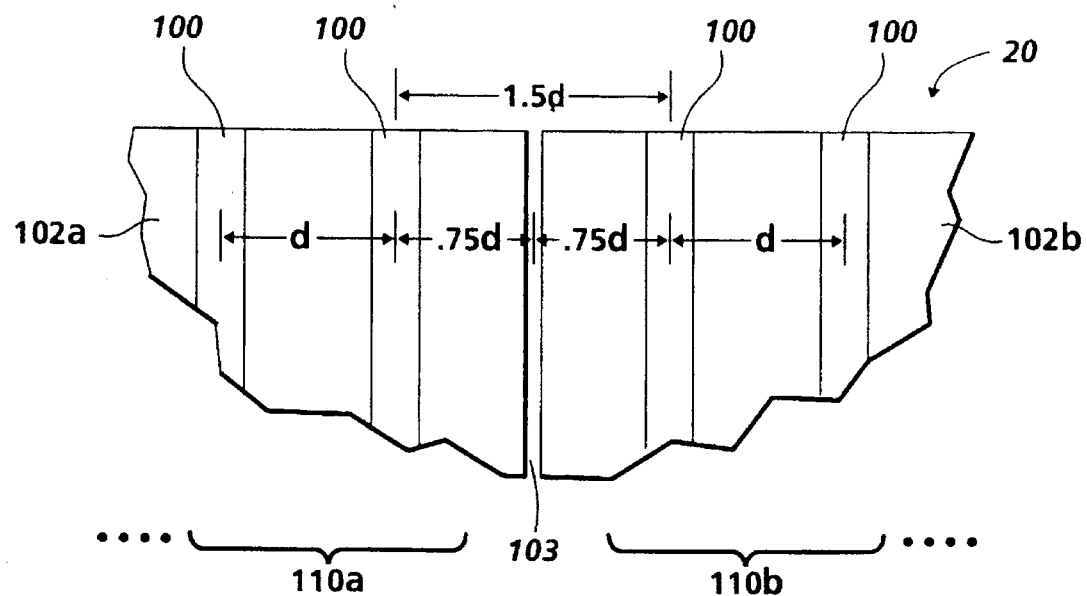
FIG. 13 is a plan view of a detail of one embodiment of a printhead according the present invention.

FIG. 13 shows a detail of construction of a particular embodiment of a printhead 20 according to the present invention. In the view of FIG. 13 a section of one portion of a printhead 20 is shown at the junction between ejector sets 110a and 110b. As mentioned above, it is a typical construction of an ink-jet printhead to create the channels forming a portion of each ejector by an etching channels or grooves in a silicon substrate. FIG. 13 shows representative portions of ejector 100, such as etched channels, formed on two separate silicon chips 102a, 102b. As illustrated in FIG. 13, within each chip the ejectors 100 are spaced at a regular pitch d, while the distance from the last ejector 100 and the edge of the chip in both cases is 0.75 d. When two such chips 102a, having ejector set 110a, and chip 102b, including ejectors 110b, are placed together, at the point of abutment 103 the total spacing between the adjacent last ejectors 100 from the two sets 110a and 110b will add up to 1.5 d, as shown. Such a construction is useful in a mass-production process for the case of a large number N of ejectors, as it allows for both accurate spacing in the crucial junction area and also allows more flexibility to discard individual chips such as 102a or 102b which prove defective, without having to discard a larger, more expensive chip defining both sets of ejectors.

Figure 14:
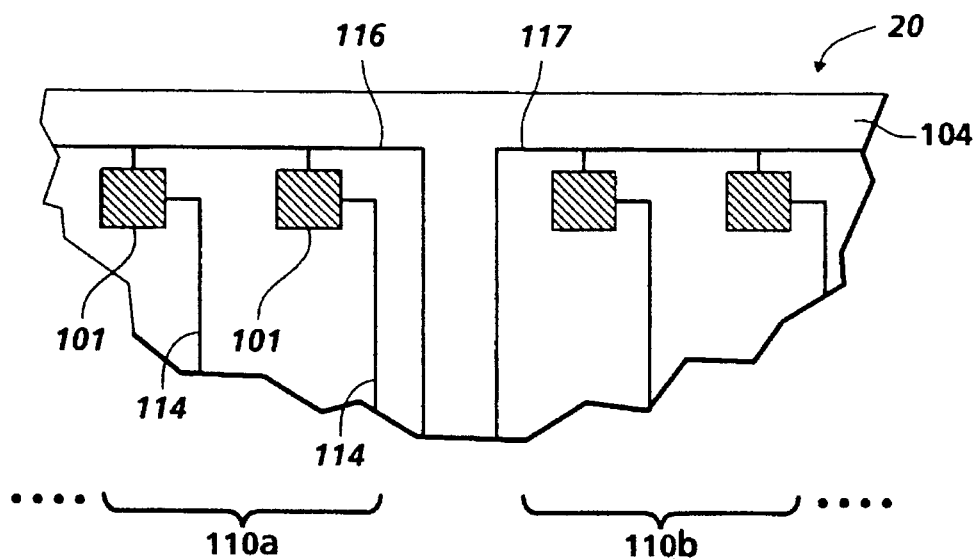
FIG. 14 is a plan view showing a detail of another embodiment of a printhead according to the present invention.

Another important practical advantage afforded by the printhead according to the present invention is that the generally wider spacing between ejectors, required to enable the interleaving of print lines in successive passes at the printhead, opens up a significant amount of space within a printhead for placement of ancillary connections, such as switch wires, power supply leads, and ground connections. FIG. 14 is a plan view of another portion of a possible design of a printhead 20, in this case the portion of the printhead 20 in which the heating element corresponding to each ejector in a thermal ink-jet printhead, here indicated as 101, is formed in a silicon substrate under conventional techniques of chip design. In one generally common design of a thermal ink-jet printhead, a chip here generally indicated as 104 with heating elements 101 defined therein is typically bonded face to face to one or more chips such as 102a or 102b in FIG. 13, in such a manner that the heating elements 101 in chip 104 align with the channels in chip 102a, or 102b, to form complete ejectors.

As shown in FIG. 14, the relatively wide spacing of ejectors, compared to printheads in which the ejectors are intended to be almost immediately adjacent to each other, provides extra "real estate" for ancillary electronic components. For example, each heating element 101 can be connected to a ground lead 114, and also to a power supply lead 116 or 117. The extra wide spacing between the heating elements 101 corresponding to sets 110a and 110b can be used, as shown as a special "hallway" for important leads in a chip architecture such as the power supply leads 116, 117 as shown. The generally wide spacing of ejectors in printhead 20 according to the present invention thus gives a designer significant scope for placing electronic structures in the printhead as necessary or desired. This becomes increasingly important as printing resolutions at 600 spi or higher are desired.

Another advantage of the system of the present invention is that the individual ejectors can be spaced further apart on the printhead 20. This relatively wide spacing of ejectors is likely to increase the reliability of individual printheads. In the prior art, many printhead-related print-quality failures are traceable to the fact that close crowding of adjacent ejectors creates problems of, for example, fluidic cross talk, or fragility of the butting edge walls of chips 102a or 102b at point of abutment 103, etc. By spacing the ejectors further apart, many of these problems are minimized.

The invention has been described with regard to partial pitch offsets between collinear arrays, but, of course, it also applies to partial pitch offsets in two-dimensional arrays. Such two-dimensional arrays may be constructed of multiple substantially parallel single color arrays of the type shown in FIG. 2, each printhead dedicated to a different primary color ink. Two-dimensional arrays with partial pitch offsets can also be constructed in roof shooter architectures in order to facilitate higher resolution printing.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A printhead for ejecting ink imagewise onto a substrate, comprising:

a first plurality of ejectors arranged in a linear array, the ejectors thereof being spaced by a predetermined pitch; and a second plurality of ejectors arranged in a linear array collinear with the first plurality of ejectors, the ejectors thereof being spaced by the predetermined pitch;

one of the first plurality of ejectors and a neighboring one of the second plurality of ejectors being spaced from each other by an integral number of pitches plus one-half pitch.

2. The printhead of claim 1, at least a portion of each of the first plurality of ejectors and the second plurality of ejectors being defined in a single member.

3. The printhead of claim 1, at least a portion of each of the first plurality of ejectors being defined in a first member and the second plurality of ejectors being defined in a second member.

4. The printhead of claim 1, the first plurality of ejectors and the second plurality of ejectors being spaced from each other by 1.5 pitches.

5. The printhead of claim 1, wherein each ejector in the printhead creating a spot on the substrate of a predetermined diameter, the predetermined diameter being about half the square root of 2 times the pitch.

6. The printhead of claim 1, wherein each plurality of ejectors includes contiguous subsets of ejectors along the linear array, each subset of ejectors ejecting ink of a preselected color.

7. An ink-jet printer for ejecting ink imagewise onto a substrate, comprising:

a printhead, including
a first plurality of ejectors arranged in a linear array, the ejectors thereof being spaced by a predetermined pitch, and
a second plurality of ejectors arranged in a linear array collinear with the first plurality of ejectors, the ejectors thereof being spaced by the predetermined pitch, one of the first plurality of ejectors and a neighboring one of the second plurality of ejectors being spaced from each other by an integral number of pitches plus one-half pitch; and means for moving the printhead relative to the substrate along a path in a fast scan direction perpendicular to the linear arrays.

8. The printer of claim 7, further comprising means for indexing the substrate relative to the printhead by an index length along a path perpendicular to the fast scan direction.

9. The printer of claim 8, wherein the indexing means indexing the substrate relative to the printhead by an index length consistent with interleaving a swath created by the second plurality of ejectors with a swath created by the first plurality of ejectors.

10. The printer of claim 7, the first plurality of ejectors and the second plurality of ejectors being spaced from each other by 1.5 pitches.

11. The printer of claim 7, wherein each ejector in the printhead creating a spot on the substrate of a predetermined diameter, the predetermined diameter being about half the square root of 2 times the predetermined pitch.

12. The printer of claim 7, further comprising control means, responsive to imagewise digital data, causing ejectors in the printhead to skip a periodic proportion of pixel areas on a preselected area of the substrate when moving through the fast-scan direction.

13. The printer of claim 7, wherein each plurality of ejectors includes contiguous subsets of ejectors along the linear array, each subset of ejectors ejecting ink of a preselected color.

14. An ink-jet printer for ejecting ink imagewise onto a substrate, comprising:

a printhead, including a first plurality of ejectors arranged in a linear array, the ejectors thereof being spaced by a predetermined pitch, and a second plurality of ejectors arranged in a linear array collinear with the first plurality of ejectors and having an equal number of ejectors as the first plurality of ejectors, the ejectors thereof being spaced by the predetermined pitch, the first plurality of ejectors and the second plurality of ejectors being spaced from each other by 1.5 pitches;

means for moving the printhead relative to the substrate along a path in a fast scan direction perpendicular to the linear arrays; and means for indexing the substrate relative to the printhead by an index length along a path perpendicular to the fast scan direction, the index length being equal to 0.5, times the number of ejectors in each plurality of ejectors, times the predetermined pitch.

15. The printer of claim 14, further comprising control means, responsive to imagewise digital data, causing ejectors in the printhead to skip every other pixel area on a preselected area of the substrate when moving through the fast-scan direction.

16. The printer of claim 14, wherein each plurality of ejectors includes at least three contiguous subsets of ejectors along the linear array, each subset of ejecting ink of a preselected primary color.

17. A printing apparatus for ejecting ink imagewise onto a substrate, comprising:

a first plurality of ejectors arranged in a linear array, the ejectors thereof being spaced by a predetermined pitch; and a second plurality of ejectors arranged in a linear array collinear with the first plurality of ejectors, the ejectors thereof being spaced by the predetermined pitch;

one of the first plurality of ejectors and a neighboring one of the second plurality of ejectors being spaced from each other by an integral number of pitches plus a multiple of one-third pitch.

18. The apparatus of claim 17, wherein each plurality of ejectors includes contiguous subsets of ejectors along the linear array, each subset of ejectors being adapted to eject ink of a preselected color.

19. The apparatus of claim 17, further comprising:

means for moving the printhead relative to a substrate along a path in a fast scan direction perpendicular to the linear arrays; and means for indexing the substrate relative to the printhead by an index length along a path perpendicular to the fast scan direction, the index length consistent with interleaving a swath created by the second plurality of ejectors with a swath created by the first plurality of ejectors.

* * * * *